United States Patent

McAdams, Jr.

[15] 3,641,532
[45] Feb. 8, 1972

[54] FAULT MONITOR FOR USE WITHIN A SYNCHRO-TORQUE SYSTEM

[72] Inventor: Hugh P. McAdams, Jr., Drexel Hill, Pa.
[73] Assignee: Litton Precision Products, Inc., Beverly Hills, Calif.
[22] Filed: Jan. 26, 1970
[21] Appl. No.: 5,768

[52] U.S. Cl. ........................................... 340/198, 340/253 H
[51] Int. Cl. ............................................................. G08c 19/00
[58] Field of Search ................................. 340/198, 248, 253

[56] References Cited

UNITED STATES PATENTS

| | | | |
|---|---|---|---|
| 3,024,451 | 3/1962 | Potter | 340/253 B |
| 3,038,149 | 6/1962 | Sylvander | 340/198 |
| 3,534,349 | 10/1970 | Mallinson | 340/198 |

*Primary Examiner*—Donald J. Yusko
*Attorney*—M. Michael Carpenter, Alan C. Rose and Alfred B. Levine

[57] ABSTRACT

A fault monitor is connected within a synchro-torque system between a synchro transmitter and a synchro receiver forming the system. The synchro transmitter is energized by alternating current that transmits data to the synchro receiver over electrical conductors to which the fault monitor is connected for receiving energizing alternating current. The monitor passes generated direct current through the synchro transmitter and receiver and applies the current to monitoring switches connected to a warning device. The warning device is energized in the absence of the direct current for indicating a fault condition within the synchro-torque system.

5 Claims, 1 Drawing Figure

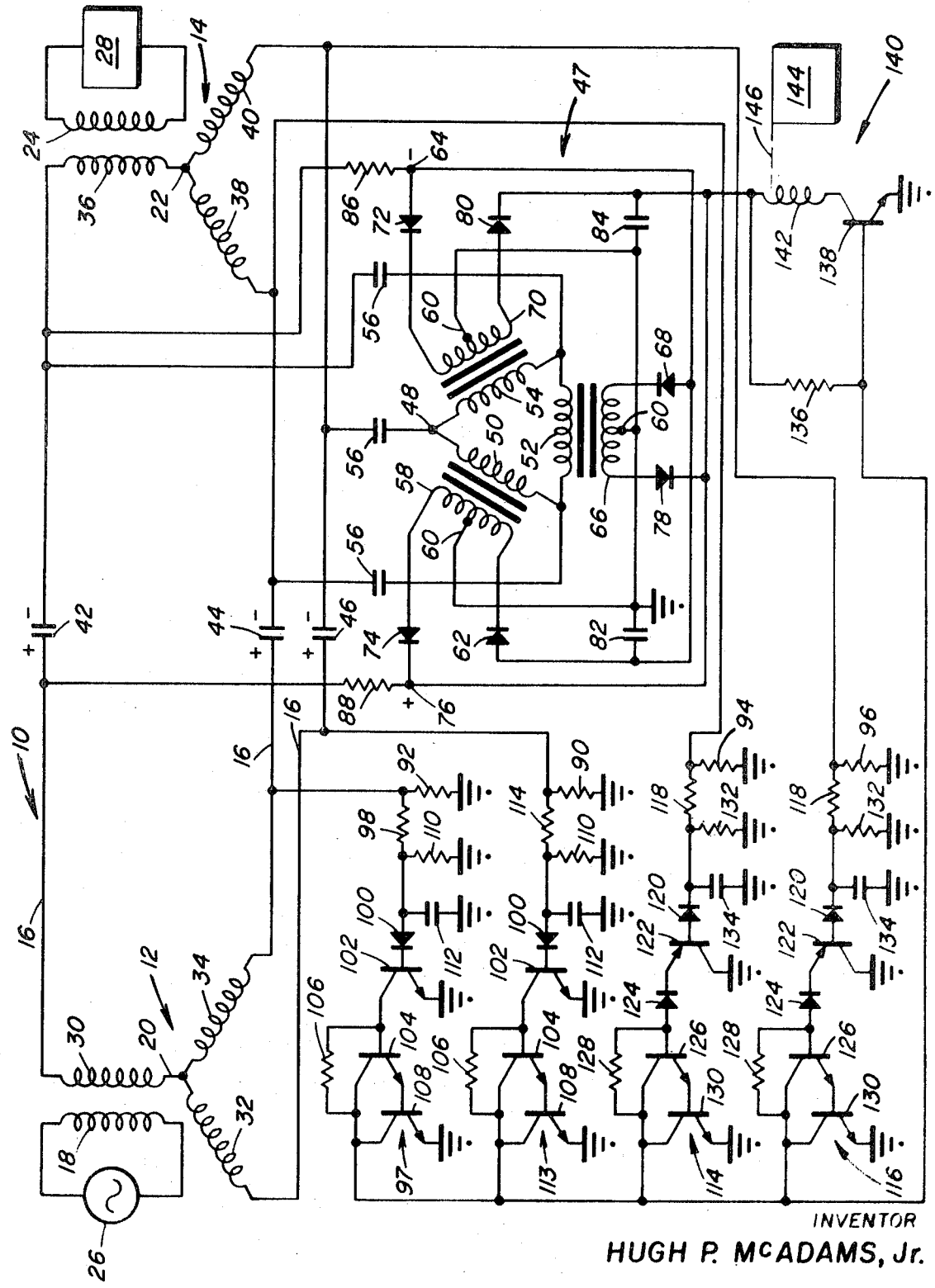
INVENTOR
HUGH P. McADAMS, Jr.
BY
M. Michael Carpenter
ATTORNEY

FAULT MONITOR FOR USE WITHIN A SYNCHRO-TORQUE SYSTEM

The present invention relates to a fault monitor for use within a synchro-torque system; and, more particularly, to an improved monitor device which provides a warning of a failure within a synchro transmitter, synchro receiver, or the electrical conductors therebetween which form the synchro-torque system.

The use of synchro-torque systems is well known in the prior art. One application for a synchro-torque system is as a data-transmission system within an aircraft. In this type of system, a synchro transmitter is utilized to provide an electrical indication of an aircraft instrument reading, such as an altimeter. The instrument reading is transmitted, in the form of electrical signals, through electrical conductors to a synchro receiver which drives the rotor thereof to the position determined by the electrical signals. The synchro receiver rotor thus approximates the rotor position of the synchro transmitter for providing a remote signal which may be applied to the input of a control system of the conventional type. If the synchro-torque system were to fail, due, for example, to an electrical short, the remote synchro receiver would continue to provide an erroneous output signal. It has been a common practice in the prior art, to provide a redundant synchro-torque system. However, this practice creates two indications and, on the occasions when one fails, the operator is unable to determine which system is correct. When the information being monitored is critical, it is not uncommon to provide a third redundant system wherein the operator is able to assume that in two matching indications are correct. Obviously, this redundancy is undesireable in terms of cost, bulk and weight.

The prior art has provided integrity monitoring systems to overcome this problem. One such system utilizes a Wheatstone bridge circuit including, as opposite arms of the bridge, three resistors together with a variable calibrating resistors and a DC voltage source connected across the input lines of the bridge circuit. This monitoring system is undesirable in that it requires an external power source, is temperature sensitive, and does not detect all failures within the monitored system, such as shorts within the synchro transmitter or synchro receiver rotors and power failure.

A second prior art monitoring system utilizes an inductive transformer to connect the monitor to the electrical conductors between the synchro transmitter and the synchro receiver. This system, while not being as temperature sensitive as the other prior art system, still requires an external power supply. Further, this system is not capable of detecting shorts within the synchro transmitter or synchro receiver rotors.

Accordingly, it is an object of the present invention to provide a fault monitor which is capable of detecting a plurality of potential failures within a synchro-torque system.

Another object of the present invention is to provide a fault monitor which is capable of sensing the presence or absence of electrical power within a synchro-torque system and, further, is capable of sensing a short within the synchro transmitter and the synchro resolver rotors of that system.

Still another object of the present invention is to provide a fault monitor which is capable of monitoring a synchro-torque system without requiring an external power supply.

A further object of the invention herein presented is to provide a fault monitor for use with a synchro-torque system which requires no balancing, requires no external power supply, is insensitive to temperature change, and is capable of sensing a plurality of possible failures therein.

Still a further object of the present invention provides a fault monitor which may be easily inserted between a synchro transmitter and a synchro receiver for monitoring the synchro-torque system thus formed without requiring an external power supply.

In accomplishing these and other objects, there is provided a monitoring circuit connected to the electrical conductors joining the synchro transmitter and the synchro receiver forming the synchro-torque system. An electrical circuit generates a direct current which is passed through a plurality of direct current paths within the synchro transmitter and the synchro resolver. A plurality of switching means are connected within and energized by the direct current paths. In the absence of a direct current, a warning device, connected to the switching means, is energized for providing an indication of a failure within the synchro-torque system.

Other objects and many of the attendant advantages of the present invention will become better understood when considered in connection with the following detailed specification and the single figure which forms the drawing; wherein, the single figure shows a schematic circuit diagram of a fault monitor embodying the present invention.

Referring now to the drawing, a synchro-torque system is shown generally at 10 including a synchro transmitter 12 and a synchro receiver 14 connected by a plurality of electrical conductors 16. The synchro transmitter 12 includes a rotor winding 18 inductively coupled to a stator winding 20 which in turn, connects over electrical conductors 16 to a stator winding 22 of the synchro receiver 14. The stator winding 22 inductively couples to a rotor winding 24 within the synchro receiver 14. The synchro transmitter rotor 18 is energized by an alternating current of a predetermined constant magnitude and frequency supplied by a suitable AC source shown schematically at 26.

The rotor winding 18 is angularly position relative to the stator winding 20 by the shaft thereof which may be operated by a suitable electromechanical system, as, for example, an aircraft altimeter (not shown). In this case, the source of predetermined constant magnitude and frequency alternating current 26 may be a conventional aircraft 400-cycle alternating current power supply. The rotor winding 24 of the synchro receiver is angularly positioned in a follow up action relative to the stator winding 22. Thus, upon angular adjustment, the synchro transmitter rotor winding 18 induces an electrical signal within the stator winding 20 and generates an AC electrical signal over conductors 16 to the synchro receiver stator winding 22 for effectively repositioning the rotor winding 24 thereof. The rotor winding 24 may be connected to a suitable control system, shown schematically at 28.

The stator winding 20 of the synchro transmitter 12 is formed in a Y configuration by individual windings 30, 32 and 34. These windings are connected by electrical conductors 16 to the synchro receiver stator 22 having a similar Y configurated winding formed by individual coils 36, 38 and 40. A blocking capacitor 42 has one electrode thereof connected to the terminal of individual coil 30 and the other electrode connected to the terminal of individual coil 36, thus placing it in one of the electrical conductors 16 between the synchro transmitter 12 and the synchro receiver 14. This capacitor 42 passes alternating current between the transmitter and receiver while blocking direct current therebetween. Similarly, a second capacitor 44 is located between individual coils 34 and 38 and a third capacitor 46 is located between coils 32 and 40.

A direct current generator circuit 47 includes a transformer 48 having three primary windings 50, 52 and 54 connected in a delta configuration for forming three input terminals between each of the junctions of two of the windings. Each input terminal is connected through capacitor 56 to one of the three electrical conductors 16. The first primary winding 50 is inductively coupled to a secondary winding 58 whose center tap 60 is connected to a source of reference potential, such as ground. One end of the secondary winding 58 connects to the cathode of a diode 62 whose anode connect to a negative junction 64. In a similar manner, the primary winding 52 is inductively coupled to a secondary winding 66; while the center tap 60 thereof connects to ground. One end or terminal of winding 66 connects to the negative junction 64 through a diode 68. Finally, the third primary winding 54 is inductively coupled to a secondary winding 70 whose center tap 60 connects to ground and whose first end or terminal connects through a diode 72 to the negative junction 64.

The second end of the secondary winding 58 connects to the anode of a diode 74 whose cathode connects to a positive junction node 76. Similarly, the second end of the secondary winding 66 connects through a diode 78 to the positive junction 76; while the secondary winding 70 has its second end connected through a diode 80 to the positive junction 76. The negative junction 64 connects through a filtering capacitor 82 to ground, and the positive junction 76 connects through a filtering capacitor 84 to ground. The negative potential thus provided at the negative junction 64 is connected via a resistor 86 to the electrical conductor 26 located between the windings 30 and 36 within the synchro transmitter and the synchro receiver, respectively. Similarly, the positive potential at the junction 76 connects through a resistor 88 to the same electrical conductor 16 on the opposite side of the blocking capacitor 42 from the previously mentioned connection.

Through this arrangement, the alternating current passing through the electrical conductors 16 generates a direct current within the direct current generating circuit 47 which is applied as a positive potential to the junction 76 and as a negative potential to the junction 64. The positive potential from junction 76 is kept from entering the synchro receiver 14 via winding 36 by the blocking capacitor 42. As a result, a current passes through winding 30 within the synchro transmitter 12 and divides through windings 32 and 34 thereof. After passing through the windings 32, the current passes via resistor 90 to ground, thus completing the current path. In a similar manner, current passes through coil 34 via resistor 92 to ground to establish a second current path. The negative potential at junction 64 passes a current through the winding 36 of the synchro receiver 14 which divides through windings 38 and 40, passes to ground through winding 38 via resistor 94 and passes to ground through winding 40 via resistor 96. Thus, four current paths are established which include windings 30–32 and windings 30–34 within the synchro transmitter and windings 36–38 and 36–40 within the synchro receiver.

The DC current passing through the current paths just discussed is applied to a plurality of switching circuits which monitor the presence thereof. A first switching circuit 97 connects via a resistor 98 to one of the electrical conductors 16 between capacitor 44 and winding 34. The resistor 98 is connected to the anode of a diode 100 whose cathode connects to the base of an NPN-transistor 102. The emitter of transistor 102 is connected to a source of reference potential, such as ground; while its collector is connected to the base of a second NPN-transistor 104 and through a resistor 106 to the collector thereof. The emitter of transistor 104 is connected to the base of a third NPN-transistor 108 whose collector connects to the collector of transistor 104 and whose emitter connects to ground. The node between the resistor 98 and the anode of diode 100 is connected to ground via a parallel circuit including a resistor 110 and a capacitor 112 which forms a filter in combination with resistor 98 and completes the first switching circuit.

A second switching circuit 113, substantially identical to the first, is connected via a first resistor 114 to another of the electrical conductors 16 between capacitor 46 and winding 32. The remaining circuit includes three NPN-transistors which form a switching network identical to that described hereinabove and, for that reason, like reference numbers have been applied to like components.

It will be noted that each of the switching circuits 97 and 113 are energized when the positive potential applied to the base of transistor 102 undergoes a change in the negative direction, such as would occur if a short were to develop in the electrical conductor 16 or one of the windings 30, 32 or 34 within the synchro transmitter 12. A decreasing potential turns off transistor 102 causing transistor 104 to turn on which, in turn, turns on transistor 108.

Third and fourth switching circuits 114 and 116 are connected to the electrical conductor 16 via resistors 118 connected between the capacitors 44 and 46 and the windings 38 and 40, respectively. As each switching circuit is identical, only one circuit will be described while like reference numbers will be applied to like components. Each circuit is similar to the first and second switching circuit 97 and 113 described hereinabove. However, the resistor 118 connects to the cathode of a diode 120 whose anode connects to the base of a PNP-transistor 122. The collector of transistor 122 connects to ground while the emitter thereof connects to the cathode of a diode 124 whose anode connects to the base of an NPN-transistor 126. A resistor 128 connects the base of transistor 126 to the cathode thereof and to the collector of a third NPN-transistor 130. The emitter of transistor 126 connects to the base of transistor 130, while the emitter of transistor 130 connects to ground. A resistor 132 and capacitor 134 connect the node between the resistor 118 and the diode 120 to a point of reference potential, such as ground, for forming a filtering circuit with resistor 118. In the third and fourth switching circuit 114 and 116, a negative potential applied through the resistor 118 is also applied to the base of the transistor 122. As the negative potential goes positive due to a short, for example, the transistor 122 is turned off, turning on transistors 126 and 130.

The collectors of transistors 108 in switching circuits 97 and 113 and the collectors of transistors 130 in switching circuits 114 and 116 connect via a resistor 136 to the positive junction 76 within the direct current generating circuit 47. These collectors also connect to the base of an NPN-transistor 138 within a warning device 140. The emitter of the transistor 138 connects to ground and the collector thereof connects to one end of a galvanometer coil 142. A visual indicator, such as a flag 144, is connected to the galvanometer coil 142 by mechanical means, shown schematically as a dashed line 146. The second end of the galvanometer coil 142 connects electrically to the positive junction 76 to complete the circuit.

Under normal operating conditions, alternating current flowing between the synchro transmitter 12 and the synchro receiver 14 generates a direct current in the generator 47 which passes through the galvanometer coil 142 and transistor 138 to ground. This causes the coil to be displaced in the conventional manner and removes the flag 144 from its warning position. When a failure occurs, one of the switching circuits will detect the absence of a direct current flowing through its associated current path. This causes transistors 108 or 130 to become conductive, as described hereinabove, for turning off transistor 138 and removing current from the galvanometer coil 142. The coil then rotates under the urging of its suspension system for placing the flag 144 in a warning position to provide a fault indication.

It will be seen that the present invention is capable of monitoring faults, such as electrical shorts, within the electrical conductor 16 and within each of the synchro transmitter stator windings 30, 32 and 34. Also, the fault monitor is capable of monitoring failures within the synchro receiver stator windings 36, 38 and 40. Further, should the synchro transmitter rotor 18 develop a short, the fault condition is indicated. This is due to the fact that such a short condition within the synchro transmitter removes power from the electrical conductors 16 thus removing current from the galvanometer coil 142 and indicating the fault. Obviously, the failure of the electrical power would also be indicated as a fault. If it is desired to fault monitor the synchro receiver rotor 24, the circuit may be modified by adding a capacitor, such as capacitor 42, and connecting the negative junction 64 to one electrode of the capacitor. The end of the rotor 24 opposite the capacitor would then be connected to ground via a resistor 96 and a switching circuit 116 connected thereto. Such a system would provide a fault indication whenever a short developed in the rotor 24 by removing the current from the galvanometer coil 142, as previously described.

Obviously, the circuitry for generating the direct current within each separate current path and the switching circuitry may be modified by persons having ordinary skill in the art. Further, the warning device may also be modified without departing from the scope of the present invention, for example, by replacing the galvanometer with another meter movement or a light. Therefore, it is to be understood that the present invention is to be limited only by the appended claims.

The embodiment of the invention in which an exclusive property or privilege is claimed are defined as follows:

1. A fault monitor for use within a data-transmission system having a synchro transmitter connected by electrical conductors to a synchro receiver wherein said synchro transmitter is energized by a source of alternating current for transmitting said data to said synchro receiver, comprising:
   direct current generating means connected to said electrical conductors for receiving said alternating current passing therethrough and for generating a direct current through said electrical conductors, said synchro transmitter and said synchro receiver;
   means connected in said electrical conductors between said synchro transmitter and said synchro receiver for passing said alternating current and blocking said direct current thus creating separate direct current flow paths through said electrical conductors, said synchro transmitter and said synchro receiver;
   switching means connected to said electrical conductors for detecting said direct current flowing in said separate current paths; and
   warning means connected to and controlled by said switching means and connected to and energized by said direct current generating means for providing a warning when said switching means detects an absence of said direct current flow thereby warning of a fault in said electrical conductors, said synchro transmitter and said synchro receiver and for providing a warning when said alternating current fails.

2. A fault monitor for use within a data-transmission system as claimed in claim 1, wherein:
   said electrical conductors include three conductors;
   said means connected in said electrical conductors for passing alternating current and blocking direct current include capacitor means;
   said direct current generating means receives said alternating current from each of said electrical conductors and connects on each side of one of said capacitor means within one of said electrical conductors for providing direct current to said system; and
   said switching means connect to the two remaining electrical conductors on each side of said capacitor means for sensing direct current flowing therethrough.

3. A fault monitor for use within a data-transmission system as claimed in claim 2, wherein said direct current generating means comprises:
   delta transformer means having a primary and secondary windings and having each terminal between said primary windings connected to one of said electrical conductors;
   a positive and a negative junction,
   asymmetrical voltage current means connecting said secondary windings of said transformer means to said positive and negative junctions for generating direct currents at said junctions;
   said positive junction connected to one of said electrical conductors on one side of said capacitor means connected therein; and
   said negative junction connected to said last mentioned electrical conductor on the other side of said capacitor means connected therein;
   whereby a plurality of direct current flow paths are formed through said electrical conductors, said synchro transmitter and said synchro receiver.

4. A fault monitor for use within a data-transmission system as claimed in claim 2, wherein said switching means comprises:
   a source of common potential;
   resistive means connecting said two remaining electrical conductors to said source of common potential;
   resistive, capacitive network means connected between said resistive means and each of said two remaining electrical conductors for filtering said direct current; and;
   transistor means connected to said resistive, capacitive network means for providing a conductive path when the potential of said direct current drops toward said common potential.

5. A fault monitor for use within a data-transmission system as claimed in claim 2, wherein said warning means comprises;
   a source of common potential;
   a galvanometer coil connected to said direct current generating means;
   an indicating device attached to said galvanometer coil for assuming a first position when said direct current flows through said coil and a second position in the absence of said direct current flow;
   control means connecting said galvanometer coil to said source of common potential; and
   said switching means connected to said control means for controlling said direct current flow within said galvanometer coil and thereby controlling the position of said indicating device.

* * * * *